US012603808B2

(12) United States Patent
Dong

(10) Patent No.: US 12,603,808 B2
(45) Date of Patent: Apr. 14, 2026

(54) METHOD FOR SENDING INFORMATION, COMMUNICATION DEVICE AND COMPUTER-READABLE STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 337 days.

(21) Appl. No.: 18/251,292

(22) PCT Filed: Nov. 6, 2020

(86) PCT No.: PCT/CN2020/127233
§ 371 (c)(1),
(2) Date: May 1, 2023

(87) PCT Pub. No.: WO2022/094957
PCT Pub. Date: May 12, 2022

(65) Prior Publication Data
US 2023/0412448 A1     Dec. 21, 2023

(51) Int. Cl.
H04L 5/00 (2006.01)
H04L 27/26 (2006.01)
H04L 27/36 (2006.01)

(52) U.S. Cl.
CPC ............ H04L 27/36 (2013.01); H04L 5/0044 (2013.01); H04L 27/2602 (2013.01)

(58) Field of Classification Search
CPC ... H04L 27/36; H04L 5/0044; H04L 27/2602; H04L 1/0003; H04L 5/0094; H04L 5/0053; H04L 27/0008; H04L 27/34; H04W 84/12
See application file for complete search history.

(56) References Cited

U.S. PATENT DOCUMENTS

| | | | | |
|---|---|---|---|---|
| 10,447,519 | B2 * | 10/2019 | Huang | ..................... H04L 1/00 |
| 2018/0048503 | A1 | 2/2018 | Kim et al. | |
| 2018/0103438 | A1 * | 4/2018 | Zhou | .................... H04W 60/00 |

(Continued)

FOREIGN PATENT DOCUMENTS

| | | |
|---|---|---|
| CN | 116235627 A | 6/2023 |
| JP | 2019515584 A | 6/2019 |

OTHER PUBLICATIONS

Notice of the first review opinion of the China National Intellectual Property Administration for Application No. 202080003134.2, dated Jul. 10, 2023, 18 pages.

(Continued)

*Primary Examiner* — Lan-Huong Truong
(74) *Attorney, Agent, or Firm* — Finnegan, Henderson, Farabow, Garrett & Dunner, L.L.P.

(57) ABSTRACT
A method for sending information is performed by a first device, and includes: sending information to a second device, the information being provided with a padding and packet extension (PPE) thresholds information field, the PPE thresholds information field being provided with a plurality of information elements, and an information element subfield comprising a constellation index; wherein a modulation mode corresponding to the constellation index at least comprises 4096-QAM.

16 Claims, 5 Drawing Sheets sending information to a second device, the information being provided with a padding and packet extension (PPE) thresholds information field, the PPE thresholds information field being provided with a plurality of information elements, and an information element subfield comprising a constellation index; wherein a modulation mode corresponding to the constellation index at least comprises 4096-QAM

~ S101

(56) References Cited

U.S. PATENT DOCUMENTS

| 2019/0104011 | A1 | 4/2019 | Yang et al. | |
| 2020/0037325 | A1* | 1/2020 | Chu | H04W 74/06 |
| 2022/0029872 | A1* | 1/2022 | Cao | H04L 5/0094 |

OTHER PUBLICATIONS

European Patent Office, Extended European Search Report issued in Application No. 20960418.0 dated Dec. 11, 2023, 13 pages.
LAN/MAN Standards Committee of the IEEE Computer Society, "Draft Standard for Information technology—Telecommunications and information exchange between systems Local and metropolitan area networks—Specific requirements; Part 11:Wireless LAN Medium Access Control (MAC) and Physical Layer (PHY) Specifications; Amendment 6:Enhancements for High Efficiency WLAN(#1121)", IEEE P802.11axTM/D0.5, Sep. 2016, 376 pages.
Notice of Reasons for Refusal for Japanese Patent Application No. 2023-526459 issued on Feb. 13, 2024, 6 pages.
Office Action for India Application No. 202347038523, dated Aug. 16, 2024, 5 pages.
Draft Standard for Information technology—Telecommunications and information exchange between systems Local and metropolitan area networks—Specific requirements, Part 11: "Wireless LAN Medium Access Control (MAC) and Physical Layer (PHY) Specifications", Amendment 6: Enhancements for High Efficiency WLAN, IEEE P802.11ax/D3.0, Jun. 2018, 682 pages.
Office Action issued by the Korean Patent Office on Jul. 7, 2025, in corresponding Application No. KR 10-2023-7018921, 9 pages.

* cited by examiner sending information to a second device, the information being provided with a padding and packet extension (PPE) thresholds information field, the PPE thresholds information field being provided with a plurality of information elements, and an information element subfield comprising a constellation index; wherein a modulation mode corresponding to the constellation index at least comprises 4096-QAM

| B0 | B2 | B3 | B6 | | |
|---|---|---|---|---|---|
| NSTS | | RU Index Bitmask | PPE Thresholds Info | PPE Pad | |

| Occupied bits | 3 | 4 | variable | 0 to 7 |
|---|---|---|---|---|

FIG. 2

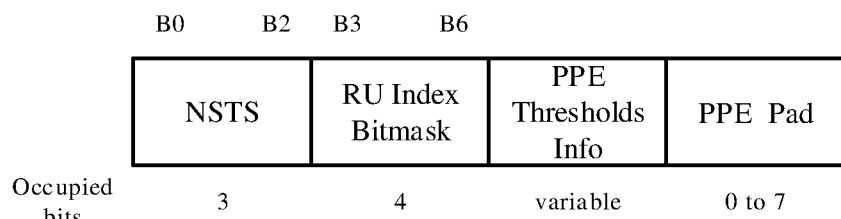

| B0 | B2 | B3 | B5 | | | | | | |
|---|---|---|---|---|---|---|---|---|---|
| PPET8 NSTS1 RUx | PPET16 NSTS1 RUx | ······ | PPET8 NSTS1 RUm | PPET16 NSTS1 RUm | ······ | PPET8 NSTSn RUm | PPET16 NSTSn RUm | | |

| Occupied bits | 3 | 3 | 3 | 3 | 3 | 3 |
|---|---|---|---|---|---|---|

FIG. 3

| Constellation index | Corresponding Transmission Constellation |
|---|---|
| 0 | BPSK |
| 1 | QPSK |
| 2 | 16-QAM |
| 3 | 64-QAM |
| 4 | 256-QAM |
| 5 | 1024-QAM |
| 6 | 4096-QAM |
| 7 | None |

FIG. 4

| RU allocation index | RU allocation size |
|---|---|
| 0 | 242 |
| 1 | 484 |
| 2 | 996 |
| 3 | 2×996 |
| 4 | 4×996 |
| ...... | ...... |

FIG. 5

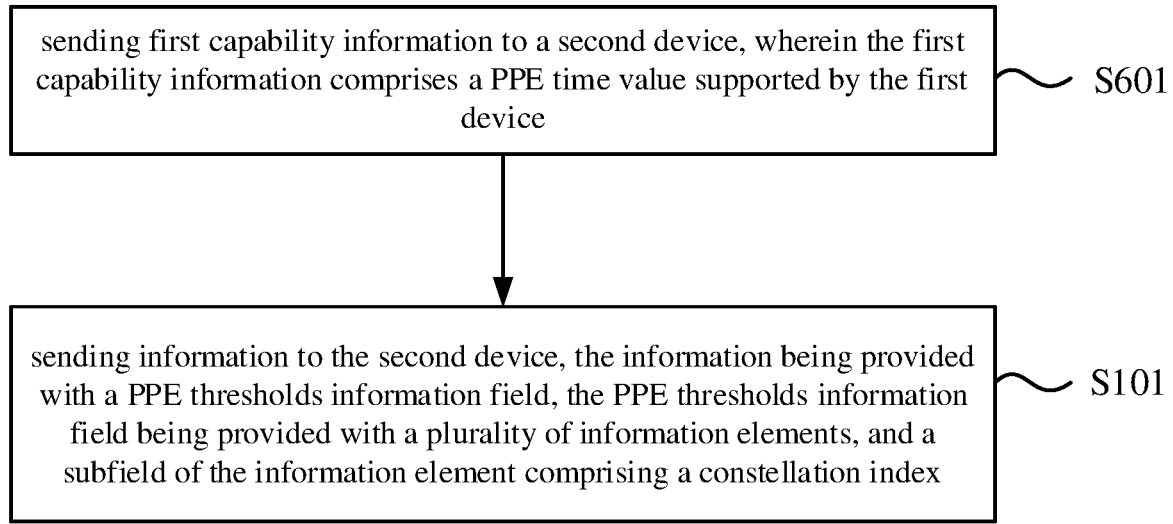
FIG. 6A
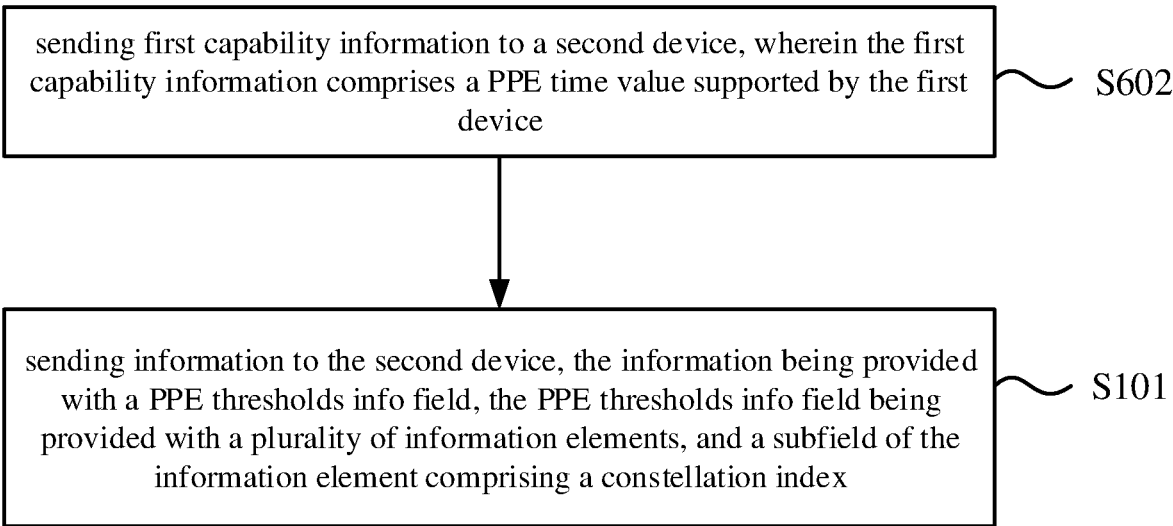
FIG. 6B
apparatus for sending information
information sending module  ⌐701
FIG. 7

METHOD FOR SENDING INFORMATION, COMMUNICATION DEVICE AND COMPUTER-READABLE STORAGE MEDIUM

CROSS-REFERENCE TO RELATED APPLICATION

This application is a national phase of International Application No. PCT/CN2020/127233, filed on Nov. 6, 2020, the entire content of which is incorporated herein by reference.

TECHNICAL FIELD

The disclosure relates to the field of communication technologies, and in particular, to a method for sending information, a communication device and a computer-readable storage medium.

BACKGROUND

The maximum bandwidth supported by the existing wireless fidelity (Wi-Fi) technology is 160 MHz. With the development of the Wi-Fi, the new Wi-Fi technology, such as IEEE802.11be, needs to expand the maximum bandwidth to 320 MHz.

SUMMARY

According to a first aspect of the disclosure, a method for sending information, performed by a first device, is provided. The method includes the following.

Information is sent to a second device, the information being provided with a padding and packet extension (PPE) thresholds information field, the PPE thresholds information field being provided with a plurality of information elements, and an information element subfield including a constellation index.

A modulation mode corresponding to the constellation index at least includes 4096-QAM.

According to a second aspect of the disclosure, a first commutation device is provided, including:

a processor; and a memory for storing instructions executable by the processor.

The processor is configured to perform the above method.

According to a third aspect of embodiments of the disclosure, a computer-readable storage medium is provided. A computer program is stored on the computer-readable storage medium. When the program is executed by a processor of a first device, the first device is caused to perform the above method.

BRIEF DESCRIPTION OF THE DRAWINGS

A brief description of drawings used in descriptions of the embodiments is given below. The drawings in the following descriptions are only example embodiments of the disclosure, and for a person skilled in the art, other embodiments can be obtained.

FIG. 1 is a schematic flowchart of a method for sending information according to some embodiments of the disclosure.

FIG. 2 is a schematic diagram of a PPE thresholds field according to some embodiments of the disclosure.

FIG. 3 is a schematic diagram of a PPE thresholds information field according to some embodiments of the disclosure.

FIG. 4 is a schematic diagram illustrating a relationship between constellation indices and modulation modes according to some embodiments of the disclosure.

FIG. 5 is a schematic diagram illustrating a relationship between resource unit (RU) allocation indices and RU allocation sizes according to some embodiments of the disclosure.

FIG. 6A is a schematic flowchart of another method for sending information according to some embodiments of the disclosure.

FIG. 6B is a schematic flowchart of yet another method for sending information according to some embodiments of the disclosure.

FIG. 7 is a schematic block diagram of an apparatus for sending information according to some embodiments of the disclosure.

DETAILED DESCRIPTION

Figure 8A:
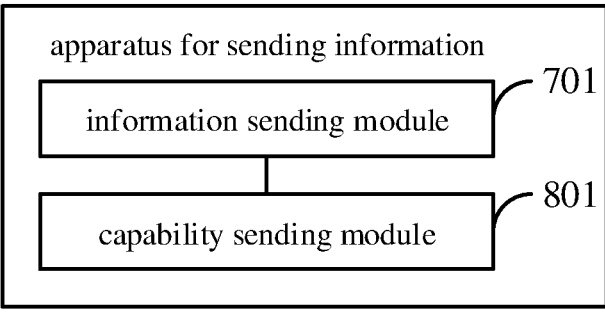
FIG. 8A is a schematic block diagram of another apparatus for sending information according to some embodiments of the disclosure.

Technical solutions in embodiments of the disclosure will be clearly and completely described below with reference to the accompanying drawings in the embodiments of the disclosure. Obviously, the described embodiments are only a part of the embodiments of the disclosure, but not all of the embodiments. Based on the embodiments in the disclosure, all other embodiments obtained by a person skilled in the art without creative efforts shall fall within the protection scope of the disclosure.

FIG. 1 is a schematic flowchart of a method for sending information according to some embodiments of the disclosure. The method for sending information illustrated in some embodiments may be applicable to a first device. The first device may communicate with a second device. The first device may be an access point (AP) or a station (STA). When the first device is an access point, the second device may be a station, and when the first device is a station, the second device may be an access point.

Subsequent embodiments are mainly described with the first device as an action execution body. In actual use, the first device and the second device may be interchanged, that is, the execution body of the subsequent embodiments may also be the second device.

As illustrated in FIG. 1, the method for sending information may include the following step.

At step S101, information is sent to a second device. The information is provided with a PPE thresholds information field, the PPE thresholds information field is provided with a plurality of information elements, and an information element subfield includes a constellation index.

A modulation mode corresponding to the constellation index at least includes 4096-QAM (which can also be approximately understood as 4k-QAM).

In some embodiments, in the communication process between devices, the device needs to process the received information and processing the information takes time. In order to reserve time for the device to process the information, the sent information can carry the PPE thresholds field.

FIG. 2 is a schematic diagram of a PPE thresholds field according to some embodiments of the disclosure.

As illustrated in FIG. 2, a format of the PPE thresholds field can include a number of space-time streams, NSTS, (also written as $N_{STS}$, STS refers to space-time stream, that is, time and space streams), resource unit (RU) Index Bitmask, PPE thresholds information, and PPE pad.

FIG. 3 is a schematic diagram of a PPE thresholds information field according to some embodiments of the disclosure.

As illustrated in FIG. 3, a format of the PPE thresholds information field can include a plurality of information elements, and each information element at least includes one of the following: a PPE time value, such as PPET16, PPET8, PPET20, etc. as illustrated in FIG. 3; NSTS, such as NSTS1 to NSTSn as illustrated in FIG. 3; a RU allocation index, such as RUx to RUm as illustrated in FIG. 3; and a subfield (not illustrated in FIG. 3) which contains a constellation index, in which n, x and m are positive integers.

It should be noted that, in the embodiments illustrated in FIG. 3, the information element includes the PPE time value, NSTS and RU allocation index. In the actual communication process, the content contained in the information element can be set as required, for example, only the PPE time value can be included. And the included PPE time value is only an example. In the actual communication process, the PPE time value can be set as required, for example, the PPE time value may only include PPET16 or PPET8.

FIG. 4 is a schematic diagram illustrating a relationship between constellation indices and modulation modes according to some embodiments of the disclosure.

As illustrated in FIG. 4, 8 constellation indices can be included in the subfields. The Corresponding Transmission Constellation of the constellation index is specifically the modulation mode. For example, the modulation mode corresponding to the constellation index 0 is binary phase shift keying (BPSK), the modulation mode corresponding to the constellation index 1 is quadrature phase shift keying (QPSK), the modulation mode corresponding to the constellation index 2 is 16-QAM, the modulation mode corresponding to the constellation index 3 is 64-QAM, the modulation mode corresponding to the constellation index 4 is 256-QAM, and the modulation mode corresponding to the constellation index 5 is 1024-QAM. In the related art, the constellation index 6 is a reserved bit. In the embodiments illustrated in FIG. 4, the modulation mode corresponding to the constellation index 6 may be set to 4096-QAM.

It should be noted that, in the actual communication process, the relationship between constellation indices and modulation modes can be set as required, which is not limited to the embodiments illustrated in FIG. 4.

Since the maximum bandwidth supported by the new Wi-Fi needs to be expanded to 320 MHz and 4k-AQM needs to be supported, the amount of data communicated between the station and the access point will also be expanded. In the related art, the modulation mode corresponding to the constellation index, for example, the modulation mode that can support the data transmission of the relatively large amount of data is only 1024-QAM, which is difficult to satisfy the data transmission of the relatively large amount of data.

According to the embodiments of the disclosure, by extending the modulation mode corresponding to the constellation index to at least include 4096-QAM, it is possible to support data transmission of a larger amount of data with a bandwidth of more than 160 MHz, for example, a bandwidth of 320 MHz, which is beneficial to ensure the communication quality between the first device and the second device.

Optionally, the information element at least includes an RU allocation index.

A RU allocation size corresponding to the RU allocation index at least includes 4*996-tone in a case of a single RU.

FIG. 5 is a schematic diagram illustrating a relationship between RU allocation indices and RU allocation sizes according to some embodiments of the disclosure.

In some embodiments, as illustrated in FIG. 5, different RU allocation indices correspond to different RU allocation sizes and the RU allocation size is represented by the number of subcarriers. For example, the RU allocation size corresponding to the RU allocation index 0 is 242-tone, the RU allocation size corresponding to the RU allocation index 1 is 484-tone, the RU allocation size corresponding to the RU allocation index 2 is 996-tone, the RU allocation size corresponding to the RU allocation index 3 is 2*996-tone, and the RU allocation size corresponding to the RU allocation index 4 is 4*996-tone, where tone can represent a subcarrier.

In addition, the RU allocation size corresponding to the RU allocation index can not only correspond to the above-mentioned multiple subcarriers, but also correspond to a single RU or a multi-RU, and for the single RU and the multi-RU, the corresponding multiple subcarriers may be the same or different.

Optionally, a number of bits occupied by the RU allocation index is greater than or equal to 4.

In the related art, there are generally only four RU allocation sizes, namely 242-tone, 484-tone, 996-tone and 2*996-tone. These RU allocation sizes are difficult to apply to the transmission of a large amount of data in a large bandwidth.

In some embodiments, the RU allocation size is expanded, so that the RU allocation size at least includes 4*996-tone in the case of the single RU, and expanding the RU allocation size requires more RU allocation indices to indicate. Therefore, it is possible to further expand the number of bits occupied by the RU allocation index. For example, it can set the bits occupied by the RU allocation index to be greater than or equal to 4 bits, which is suitable for indicating more RU allocation sizes, so as to be suitable for the transmission of the large amount of data in large bandwidth scenarios.

Optionally, the RU allocation size corresponding to the RU allocation index further includes at least one of the following in a case of a multi-RU:

2*996-tone, 4*996-tone, 484+242-tone, 996+484-tone, 996+484+242-tone, 2*996+484-tone, 3*996-tone and 3*996+484-tone.

In some embodiments, when the RU allocation size corresponding to the RU allocation index is for the multi-RU situation, the subcarriers corresponding to the multi-RU may be one or more of these 8: 2*996-tone, 4*996-tone, 484+242-tone, 996+484-tone, 996+484+242-tone, 2*996+484-tone, 3*996-tone and 3*996+484-tone.

Combining these 8 cases, as well as 5 cases of 242-tone, 484-tone, 996-tone, 2*996-tone and 4*996-tone in the single RU case, there are 13 cases in total, which can be indicated through 4 bits (which can indicate 16 cases).

Optionally, the information further includes an identification field, in which the identification field is configured to identify whether the RU allocation size corresponding to the RU allocation index is the single RU or the multi-RU.

In some embodiments, for the two cases of single RU and multi-RU, the corresponding multiple subcarriers may be the same or different. In order to distinguish the single RU and the multi-RU, the identification field can also be set in the information, for example, occupying 1 bit, and the identification field indicates that the RU allocation size corresponding to the RU allocation index is for the single RU or for the multi-RU.

For example, the subcarriers corresponding to the RU allocation size is 4*996-tone in the case of the single RU. Since there may also be the RU allocation size of 4*996-tone in the case of the multi-RU, the identification field can be used to indicate the RU allocation size corresponding to the RU allocation index is for the single-RU case, indicating that the RU allocation size is 4*996-tone in the single-RU case specifically.

Optionally, the information element at least includes a NSTS.

A number of bits occupied by the NSTS is greater than or equal to 4 and the NSTS is configured to identify at least 16 space—time streams.

In some embodiments, the information element in the PPE thresholds information field may further include the NSTS, and the bits occupied by the NSTS are greater than or equal to 4 bits, so that at least 16 STSs can be identified.

Each STS can correspond to a communication antenna. In the related art, the bits occupied by the NSTS are less than 4 bits. Some embodiments expand the bits of the NSTS, and the NSTS that occupies at least 4 bits can identify at least 16 STSs. Since 16 STSs can correspond to 16 communication antennas, it is equivalent to identifying 16 communication antennas, which is suitable for the first device with a larger number of antennas, so that the first device can communicate through a large number of antennas, to transmit a larger amount of data in the 320 MHz bandwidth.

Optionally, the information element at least includes a PPE time value.

The PPE time value at least includes 8 milliseconds and 16 milliseconds.

Optionally, the PPE time value further includes 20 milliseconds.

In some embodiments, the information element in the PPE thresholds information field may further include the PPE time value, and the PPE time value may identify the time reserved for processing the information sent by the first device. For example, the PPE time value is 8 milliseconds, that is, PPET8, and a maximum of 8 milliseconds can be reserved for processing the information. For example, the PPE time value is 16 milliseconds, that is, PPET16, and a maximum of 16 milliseconds can be reserved for processing the information.

On the basis of PPET8 and PPET16, some embodiments of the disclosure expand the PPE time value. Since the bandwidth is expanded to 320 MHz, the data volume of the information can also be increased accordingly, so the processing of the information requires more time. Therefore, the PPE time value can be extended, for example, the PPE time value can be extended to a maximum of 20 milliseconds, that is, PPET20, so as to be suitable for scenarios in which a larger amount of data is transmitted.

In some embodiments, during the communication process between the first device and the second device, a distance between the first device and the second device may also be determined, and when the distance between the first device and the second device is small, for example, less than a preset distance, the PPE time value may be PPET8 or PPET16, and when the distance between the first device and the second device is relatively large, such as greater than the preset distance, the PPE time value may be PPET20.

In some embodiments, the PPE time value may have a corresponding relationship with the RU allocation index, NSTS and constellation index. For example, in the embodiments in FIG. 2, when the RU allocation index is RUx and the NSTS is NSTS1, the PPE time value may be PPET8 and PPET16; when the NSTS is NSTS1, the RU allocation index is gradually increased to RUm, and when the RU allocation index is RUm and the NSTS is NSTS1, the PPE time values can be PPET8 and PPET16; further the NSTS is increased, and each time the NSTS is increased, the RU allocation index increases from RUx to RUm in a cycle until the NSTS increases to NSTSn. When the RU allocation index is RUm and the NSTS is NSTSn2, the PPE time values can be PPET8 and PPET16.

It should be noted that the correspondence between the PPE time value and the RU allocation index, NSTS, and constellation index is not limited to the situation in FIG. 2. For example, when the RU allocation index is RUx and the NSTS is NSTS1, the PPE time value can be PPET8 and PPET16, and when the RU allocation index is RUm and the NSTS is NSTSn2, the PPE time value can be PPET20.

FIG. 6A is a schematic flowchart of another method for sending information according to some embodiments of the disclosure. As illustrated in FIG. 6A, the method further includes the following.

In step S601, first capability information is sent to the second device, in which the first capability information includes a PPE time value supported by the first device.

In some embodiments, the first device may send the first capability information to the second device, in which the first capability information carries the PPE time value supported by the first device. The second device may determine the PPE time value supported by the first device according to the first capability information, so that when communicating with the first device, for example, when sending information to the first device, the PPE time value corresponding to the first capability information can be carried in the information sent to the first device. For example, the PPE time value supported by the first device includes PPET8, PPET16 and PPET20, and the PPE time value included in the information sent by the second device to the first device may be at least one of PPET8, PPET16 and PPET20.

In some embodiments, the first capability information may be carried in an Extremely High Throughput (EHT) Capabilities field, and the EHT Capabilities field may be included in a physical (PHY) Capabilities Information field format, e.g. carried in the current PPE Thresholds field of the PHY Capabilities Information field format.

In addition, the second device may send PHY Capability Information to the first device, and the second device may determine the PPE time value supported by the first device according to the first capability information, and then may set the Nominal Packet Padding field in the PHY Capabilities Information according to the PPE time value.

FIG. 6B is a schematic flowchart of yet another method for sending information according to some embodiments of the disclosure. As illustrated in FIG. 6B, the method further includes the following.

In step S602, second capability information from the second device is received, in which the second capability information includes a PPE time value supported by the second device.

In some embodiments, the second device may send the second capability information to the first device, in which the second capability information carries the PPE time value supported by the second device. The first device may determine the PPE time value supported by the second device according to the second capability information, so that when communicating with the second device, for example, when sending information to the second device, the PPE time value corresponding to the second capability information can be carried in the information sent to the second device. For example, the PPE time value supported by the second device includes PPET8 and PPET16, and the PPE time value included in the information sent by the first device to the second device may be at least one of PPET8 and PPET16.

In some embodiments, the second capability information may be carried in the EHT Capability field, and the EHT Capability field may be included in the PHY Capabilities Information field format, for example, carried in the current PPE Thresholds field of the PHY Capabilities Information field format.

In addition, the first device may send PHY Capability Information to the second device, and the first device may determine the PPE time value supported by the second device according to the second capability information, and then may set the Nominal Packet Padding field in the PHY Capabilities Information according to the PPE time value.

Corresponding to the foregoing embodiments of the methods for sending information, the disclosure also provides some embodiments of apparatuses for sending information.

FIG. 7 is a schematic block diagram of an apparatus for sending information according to some embodiments of the disclosure. The apparatus for sending information illustrated in some embodiments may be applicable to a first device. The first device may communicate with a second device. The first device may be an access point or a station. When the first device is an access point, the second device may be a station, and when the first device is a station, the second device may be an access point.

Subsequent embodiments are mainly described with the first device as an action execution body. In actual use, the first device and the second device may be interchanged, that is, the execution body of the subsequent embodiments may also be the second device.

As illustrated in FIG. 7, the apparatus for sending information may include an information sending module 701.

The information sending module 701 is configured to send information to a second device, the information being provided with a PPE thresholds information field, the PPE thresholds information field being provided with a plurality of information elements, and an information element subfield including a constellation index.

A modulation mode corresponding to the constellation index at least includes 4096-QAM.

Optionally, the information element at least includes an RU allocation index.

A RU allocation size corresponding to the RU allocation index at least includes 4*996-tone in a case of a single RU.

Optionally, a number of bits occupied by the RU allocation index is greater than or equal to 4.

Optionally, the RU allocation size corresponding to the RU allocation index further includes at least one of the following in a case of a multi-RU:

2*996-tone, 4*996-tone, 484+242-tone, 996+484-tone, 996+484+242-tone, 2*996+484-tone, 3*996-tone and 3*996+484-tone.

Optionally, the information further includes an identification field, in which the identification field is configured to identify whether the RU allocation size corresponding to the RU allocation index is the single RU or the multi-RU.

Optionally, the information element at least includes a NSTS.

A number of bits occupied by the NSTS is greater than or equal to 4 and the NSTS is configured to identify at least 16 space—time streams.

Optionally, the information element at least includes a PPE time value.

The PPE time value includes at least 8 milliseconds and 16 milliseconds.

Optionally, the PPE time value further includes 20 milliseconds.

FIG. 8A is a schematic block diagram of another apparatus for sending information according to some embodiments of the disclosure. As illustrated in FIG. 8A, the apparatus further includes a capability sending module 801.

The capability sending module 801 is configured to send first capability information to the second device, in which the first capability information includes a PPE time value supported by the first device.

Figure 8B:
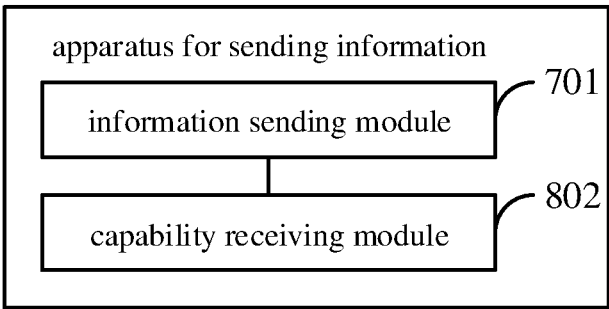
FIG. 8B is a schematic block diagram of yet another apparatus for sending information according to some embodiments of the disclosure.

FIG. 8B is a schematic block diagram of yet another apparatus for sending information according to some embodiments of the disclosure. As illustrated in FIG. 8B, the apparatus further includes a capability receiving module 802.

The capability receiving module 802 is configured to receive second capability information from the second device, in which the second capability information includes a PPE time value supported by the second device.

With respect to the apparatuses in the above embodiments, the specific manners for performing operations for individual modules therein have been described in detail in the embodiments regarding the methods, which will not be elaborated herein.

For the apparatus embodiments, since they basically correspond to the method embodiments, reference may be made to the partial descriptions of the method embodiments for related parts. The apparatus embodiments described above are only illustrative, in which modules described as separate components may or may not be physically separated, and components displayed as modules may or may not be physical modules, that is, they may be located in one place or distributed on multiple network modules. Some or all of the modules may be selected according to actual needs to achieve purposes of solutions in embodiments. A person skilled in the art can understand and implement it without creative effort.

Embodiments of the disclosure also provide an electronic device, including:

a processor; and a memory for storing instructions executable by the processor.

The processor is configured to perform the method described in any one of the above embodiments.

Embodiments of the disclosure also provide a computer-readable storage medium, on which a computer program is stored, and when the program is executed by a processor, the steps in the method described in any of the foregoing embodiments are performed.

Figure 9:
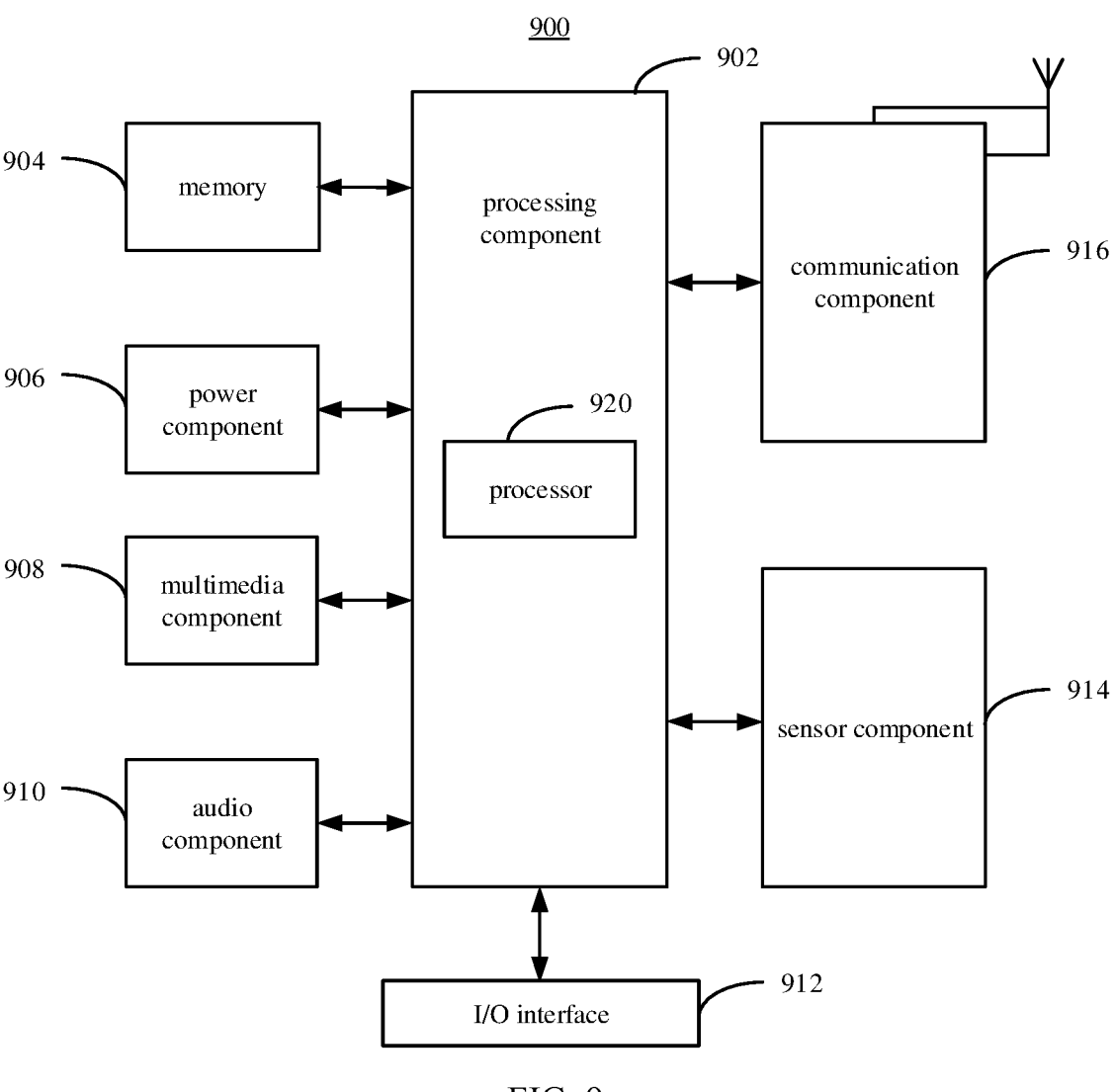
FIG. 9 is a schematic block diagram of a device for sending information according to some embodiments of the disclosure.

FIG. 9 is a schematic block diagram of a device 900 for sending information according to some embodiments of the disclosure. For example, the device 900 may be a mobile phone, a computer, a digital broadcast terminal, a messaging device, a gaming console, a tablet, a medical device, exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like.

The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, second generation (2G) or third gengeration (3G), fourth gengeration (4G) Long Term Evolution (LTE), fifth generation (5G) new radio (NR), or a combination thereof. In some embodiments, the communication component 916 receives a broadcast signal or broadcast associated information from an external broadcast management system via a broadcast channel. In some embodiments, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to a person skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sending information, performed by a first device, the method comprising:

sending information to a second device, the information being provided with a padding, a packet extension (PPE) thresholds field, and a resource unit (RU) allocation index, the PPE thresholds field comprising a PPE thresholds information field provided with a plurality of information element subfields, and one of the information element subfields comprising a constellation index;

wherein a modulation mode corresponding to the constellation index at least comprises 4096-QAM, wherein in a case of multi-RU, a RU allocation size corresponding to the RU allocation index comprises at least one of:

2*996-tone, 4*996-tone, 484+242-tone, 996+484-tone, 996+484+242-tone, 2*996+484-tone, 3*996-tone and 3*996+484-tone, wherein a number of bits occupied by the RU allocation index is greater than or equal to 4.

2. The method of claim 1, wherein, in a case of single RU, the RU allocation size corresponding to the RU allocation index at least comprises 4*996-tone.

3. The method of claim 2, wherein the information further comprises an identification field, and the identification field is configured to identify whether the RU allocation size corresponding to the RU allocation index is the single RU or the multi-RU.

4. The method of claim 1, wherein one of the information element subfields at least comprises a number of space-time stream (NSTS);

wherein a number of bits occupied by the NSTS is greater than or equal to 4 and the NSTS is configured to identify at least 16 space-time streams.

5. The method of claim 1, wherein one of the information element subfields at least comprises a PPE time value;

the PPE time value at least comprises 8 milliseconds and 16 milliseconds.

6. The method of claim 5, wherein the PPE time value further comprises 20 milliseconds.

7. The method of claim 1, further comprising:

sending first capability information to the second device, wherein the first capability information comprises a PPE time value supported by the first device.

8. The method of claim 1, further comprising:

receiving second capability information from the second device, wherein the second capability information comprises a PPE time value supported by the second device.

9. A first device, comprising:

a processor; and a memory for storing instructions executable by the processor;

wherein the processor is configured to send information to a second device, the information being provided with a padding, a packet extension (PPE) thresholds information field, and a resource unit (RU) allocation index, the PPE thresholds field comprising a PPE thresholds field provided with a plurality of information element subfields, and one of the information element subfields comprising a constellation index;

wherein a modulation mode corresponding to the constellation index at least comprises 4096-QAM, wherein in a case of multi-RU, a RU allocation size corresponding to the RU allocation index comprises at least one of:

2*996-tone, 4*996-tone, 484+242-tone, 996+484-tone, 996+484+242-tone, 2*996+484-tone, 3*996-tone and 3*996+484-tone, wherein a number of bits occupied by the RU allocation index is greater than or equal to 4.

10. The first device of claim 9, wherein, in a case of single RU, the RU allocation size corresponding to the RU allocation index further comprises 4*996-tone.

11. The first device of claim 10, wherein the information further comprises an identification field, and the identification field is configured to identify whether the RU allocation size corresponding to the RU allocation index is the single RU or the multi-RU.

12. The first device of claim 9, wherein one of the information element subfields at least comprises a number of space-time stream (NSTS);

wherein a number of bits occupied by the NSTS is greater than or equal to 4 and the NSTS is configured to identify at least 16 space-time streams.

13. The first device of claim 9, wherein one of the information element subfields at least comprises a PPE time value;

the PPE time value at least comprises 8 milliseconds and 16 milliseconds.

14. The first device of claim 13, wherein the PPE time value further comprises 20 milliseconds.

15. The first device of claim 9, wherein the processor is further configured to perform at least one of:

sending first capability information to the second device, wherein the first capability information comprises a PPE time value supported by the first device; or receiving second capability information from the second device, wherein the second capability information comprises a PPE time value supported by the second device.

16. A non-transitory computer-readable storage medium having stored therein a computer program that, when executed by a processor, cause the processor to perform:

sending information to a second device, the information being provided with a padding, a packet extension (PPE) thresholds field, and a resource unit (RU) allocation index, the PPE thresholds field comprising a PPE thresholds information field provided with a plurality of information element subfields, and one of the information element subfields comprising a constellation index;

wherein a modulation mode corresponding to the constellation index at least comprises 4096-QAM, wherein in a case of multi-RU, a RU allocation size corresponding to the RU allocation index comprises at least one of:

2*996-tone, 4*996-tone, 484+242-tone, 996+484-tone, 996+484+242-tone, 2*996+484-tone, 3*996-tone and 3*996+484-tone, wherein a number of bits occupied by the RU allocation index is greater than or equal to 4.

* * * * *